(12) United States Patent
Diemer et al.

(10) Patent No.: US 6,814,204 B2
(45) Date of Patent: Nov. 9, 2004

(54) CLUTCH UNIT FOR A MOTOR VEHICLE

(75) Inventors: Matthias Diemer, Niederwerrn (DE); Christoph Kleuker, Gochsheim (DE); Markus Heiartz, Würzburg (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/365,318

(22) Filed: Feb. 12, 2003

(65) Prior Publication Data

US 2003/0168302 A1 Sep. 11, 2003

(30) Foreign Application Priority Data

Mar. 7, 2002 (DE) .......................................... 102 10 194

(51) Int. Cl.[7] .............................................. B60K 25/02
(52) U.S. Cl. ..................................... 192/48.8; 180/53.8
(58) Field of Search ............................. 192/48.1, 48.8, 192/48.9, 89.22, 89.23, 212; 180/165, 53.8

(56) References Cited

U.S. PATENT DOCUMENTS

| | | | |
|---|---|---|---|
| 4,410,074 A | | 10/1983 | Maucher et al. ........... 192/48.7 |
| 4,958,095 A | * | 9/1990 | Uchida et al. ................ 310/59 |
| 6,427,547 B1 | * | 8/2002 | Bowen ......................... 74/329 |
| 6,457,572 B1 | * | 10/2002 | Dau et al. ................ 192/48.91 |
| 6,622,840 B2 | * | 9/2003 | Dau et al. ................ 192/48.91 |
| 6,668,953 B1 | * | 12/2003 | Reik et al. .................. 180/53.8 |

* cited by examiner

Primary Examiner—Saul Rodriguez
(74) Attorney, Agent, or Firm—Cohen, Pontani, Lieberman & Pavane

(57) ABSTRACT

A crankshaft 2 of an internal combustion engine, which is supported with freedom to rotate around an axis of rotation 3, can be connected by a first clutch 1 to a flywheel 4, which is also supported with freedom to rotate around the axis of rotation 3. In addition, the flywheel 4 can be connected by a second clutch 5 to a transmission shaft 6, also supported with freedom to rotate around the axis of rotation 3. The flywheel 4 is provided with at least one permanent magnet and thus forms the rotor 8 of a crankshaft starter-generator. The pole fields of the permanent magnets can be moved past the stator coil of a stator 9 of the crankshaft starter-generator, this coil being mounted on a stationary component. Each of the first and the second clutches 1, 5 has its own separately operated actuating means and can be engaged and disengaged either independently of each other or in common.

56 Claims, 2 Drawing Sheets

CLUTCH UNIT FOR A MOTOR VEHICLE

BACKGROUND OF THE INVENTION

1. Field of the Invention

The invention pertains to a clutch unit for a motor vehicle with a first clutch, by which a crankshaft of an internal combustion engine, which is supported with freedom to rotate around an axis of rotation, can be connected to a flywheel, also supported with freedom to rotate around the axis of rotation, and with a second clutch, by which the flywheel, which is supported with freedom to rotate around the axis of rotation, can be connected to a transmission shaft, also supported with freedom to rotate around the axis of rotation.

2. Description of the Related Art

A clutch unit of the type described above is known from U.S. Pat. No. 4,410,074, in which the two clutches can be engaged and disengaged by a common actuating means.

SUMMARY OF THE INVENTION

The object of the invention is create a clutch unit of the type indicated above which makes it possible to reduce the energy consumption of the motor vehicle regardless of the mode in which the vehicle is being operated and which is also compact and light in weight.

According to the invention, the flywheel is provided with at least one permanent magnet and thus forms the rotor of a crankshaft starter-generator, where the pole field or the pole fields of the permanent magnets can be moved passed the stator coil of the stator of the crankshaft starter-generator, this coil being mounted on an stationary component. Each of the first and the second clutches has its own separately operated actuating means and can be engaged and disengaged either independently of each other or in common.

The integration of the crankshaft starter-generator into the clutches requires only a small amount of space, is associated with only a small amount of weight, and makes it possible to achieve optimum energy utilization.

In the situation in which the first clutch is disengaged and the second clutch is engaged, it is possible for the crankshaft starter-generator to act purely as an electric motor to drive the transmission shaft, during which the internal combustion engine can be idle.

In addition, when the driver brakes the vehicle, the crankshaft starter-generator can be used as an electric brake via the transmission shaft and thus feed electrical energy into the vehicle's electrical system (recuperation).

This engagement situation can also be used to separate the motor from the transmission so that the gears of the transmission can be shifted. The transmission would in this case remain connected to the crankshaft starter-generator, which can actively synchronize the shifting and thus reduce the time required to shift the gears.

When the vehicle is stopped on a hill, the crankshaft starter-generator can generate enough torque to hold vehicle motionless on the hill. Thus a "hill-holder" function is obtained.

In the engagement situation in which both clutches are engaged, which corresponds to the normal driving mode of the motor vehicle, the internal combustion engine acts by way of the crankshaft and the two clutches not only to drive the transmission shaft but also to operate the crankshaft starter-generator in its generator mode. In addition, the crankshaft starter-generator can be supplied actively with current when it is operating as an electric motor and thus perform an "overboost" function to supplement the power of the internal combustion engine.

The transmission can be shifted up or down preferably in the situation in which the first clutch is engaged and the second clutch is disengaged; so that the vehicle can be started off, first and possibly second gear can be also be engaged in this situation. While the internal combustion engine is idle, it can charge the onboard battery of the motor vehicle via the crankshaft starter-generator.

If both clutches are disengaged, the drive train of the motor vehicle is disconnected both in front of and behind the crankshaft starter-generator. In this situation, the crankshaft starter-generator can act as a freely rotating electric motor and be accelerated to a certain speed by electrical energy from the vehicle's electrical system. This can be done without a great deal of energy, because the crankshaft starter-generator is free-wheeling. If, after this high speed is reached, the first clutch is then engaged, the mass moment of inertia of the flywheel mass of the rotor of the crankshaft starter-generator accelerates the internal combustion engine to ignition or idle speed. Then the starting-off clutch can also be engaged, and the motor vehicle can be driven normally.

This function also makes stop-and-go driving readily possible.

The crankshaft starter-generator does not have to accelerate the internal combustion engine while operating as a motor; it is instead the mass moment of inertia of the starter-generator which is utilized to start the internal combustion engine. The starter-generator therefore does not have to be designed to deliver maximum power when operating as a motor and can thus be designed for optimum efficiency for operation as a generator. This reduces fuel consumption and makes it possible for the crankshaft starter-generator to be built compactly and in a lightweight manner.

It is also possible, however, for the internal combustion engine to be started while the first clutch is engaged and the second is disengaged.

Another way in which the size of the unit and also the space requirement can be reduced is to direct the pole fields of the permanent magnet radially inward and to surround the stator radially by the rotor to form a generator of the external rotor type.

A compact design can also be achieved by providing the first and/or the second clutch with a clutch disk, which is supported with freedom to rotate around the axis of rotation and which can be actuated axially by the friction surface of a pressure plate, also supported with freedom to rotate around the axis of rotation, the disk thus being pushed against the friction surface of the flywheel.

An especially compact and space-saving design is obtained by locating the first and/or the second clutch radially inside the rotor and the stator.

The first clutch can be mounted axially outside the rotor and the stator, and the diameter of its clutch disk can be larger than that of the second clutch.

Because, with respect to the flow of torque, the first clutch is upstream of the flywheel and the second clutch downstream of it, the first clutch will, in order to avoid slipping, be designed to handle the much greater torque required than the second clutch. The second clutch can be designed to handle merely the small amount of torque applied to it and can thus be easily mounted radially inside the rotor and the stator.

The first clutch must be able to transmit not only the average torque without slipping, but also the peak dynamic torques of the internal combustion engine.

If the rotor is supported rotatably on a tubular part of the stationary component, it is possible for these two parts to be coaxial to each other with a high degree of accuracy, which means that the gap between the rotor and the stator can be made very small. This improves the operating properties of the crankshaft starter-generator and makes it possible to reduce its size.

The rotor bearing can be located axially on the side of the first clutch facing the crankshaft or axially on the side of the second clutch facing the transmission and preferably comprises one or more roller bearings, especially ball bearings. To ensure the effective transmission of torque, one or both clutch disks can carry clutch linings, upon which the flywheel friction surfaces and the pressure plate friction surfaces can act.

Because the first clutch serves essentially only to allow the crankshaft starter-generator to accelerate freely up to high speed and to provide the momentum for starting off, it does not have to offer any special smoothness of operation with respect to starting off or accelerating/decelerating. Thus the clutch linings of the first clutch can be sintered linings, preferably unsprung. The sintered linings can be fade-resistant inorganic sintered linings with a fading friction coefficient of approximately 0.4.

The sintered linings can also be metallic, however. Ceramics and fibrous composites can also be used as alternatives to sintered materials.

Because it is especially important for the second clutch to operate smoothly, to engage gently, and to resist grabbing, the clutch linings of the second clutch are preferably sprung organic linings.

If the clutch disk of the first clutch is connected around its circumference in a torsion-proof manner to the crankshaft, the criteria that smoothness of operation be de-emphasized and that high torque be transmitted are fulfilled.

So that the second clutch will engage gently, it is also useful for the clutch disk of the second clutch to have one or more torsional vibration dampers installed radially between the area of the clutch linings and the transmission shaft.

If the clutch disk of the first and/or of the second clutch is installed with flexibility in the axial direction, axial tolerances between the components which rest against each other can be compensated.

For this purpose, the clutch disk of the first and/or of the second clutch can be mounted on the crankshaft and/or on the transmission shaft with freedom to slide in the axial direction.

In a simple design, the crankshaft and/or the transmission shaft has a coaxial splined shaft part, on which the clutch disk of the first and/or of the second clutch is mounted with freedom to slide in the axial direction, so that the tumbling movements of the crankshaft or of the transmission shaft lead to a displacement of the clutch disk and to the lifting-away of the clutch linings from the friction surfaces assigned to them.

If the clutch disk of the first and/or of the second clutch has an area which pretensions the clutch linings into a position which is at an angle to a radial orientation, the clutch linings will be reliably lifted away from the friction surfaces assigned to them when the clutch is disengaged.

The first and/or the second clutch can preferably be actuated by a release device, which can pivot a ring-shaped diaphragm spring acting on the pressure plate of the clutch in question.

A compact design can be obtained by providing the release device of the first clutch with a push-rod or a pull-rod, guided in sliding fashion through the hollow transmission shaft, which rod can exert a pivoting force on the diaphragm spring.

A compact design can also be obtained by providing the release device of the second clutch with an axial bearing, which surrounds the transmission shaft with play and is free to slide in the axial direction, which axial bearing can exert a pivoting force on the diaphragm spring.

It is preferable in this case to provide a release lever or a pressure cylinder concentric to the axial bearing to actuate the axial bearing and thus to slide it in the axial direction.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
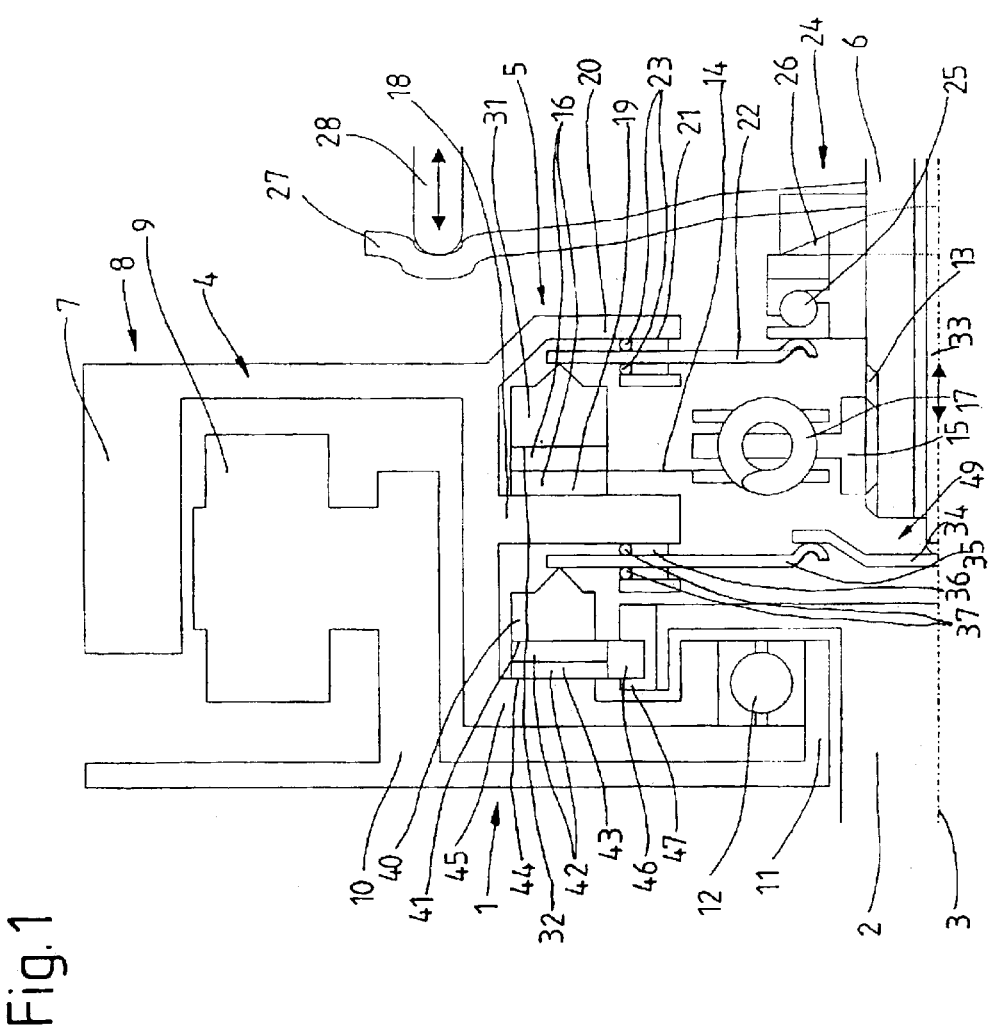
FIG. 1 shows a cross section through half of a first exemplary embodiment of a clutch unit.

The clutch units for a motor vehicle shown in the figures have a flywheel 4, which is supported so that it can rotate freely around the axis of rotation 3 and which can be connected by way of a first clutch 1 to a crankshaft 2 of an internal combustion engine (not shown), this crankshaft also turning freely around the axis of rotation 3.

In addition, the flywheel 4 can be connected by way of a second clutch 5 to a transmission shaft 6, which can rotate around the axis of rotation 3 and drive the change speed transmission of a motor vehicle.

The flywheel 4 has a ring-like part 7, which has permanent magnets (not shown) distributed uniformly around its radially inward circumferential wall. The pole fields of these magnets are directed toward the inside and form the rotor 8 of a crankshaft starter-generator, designed as a generator of the external rotor type.

This rotor encloses a ring-shaped stator 9 of the crankshaft starter-generator in an approximately U-shaped manner on both the radially inner and radially outer sides. This stator carries a stator coil (not shown), past which the pole fields of the permanent magnets of the rotor move when the rotor 8 rotates.

The stator 9 is supported by bracket arms 10 on a stationary, tubular part 11. In FIG. 1, it is the crankshaft 2 which extends coaxially through the axial tubular opening of the tubular part, and in FIG. 2, it is the transmission shaft 6 which extends coaxially through it. The bracket arms 10 extend at least primarily in the axial direction from an area enclosed by the ring-like part 7 of the rotor and in front of the stator toward the tubular part 11. So that it can rotate freely, the rotor 8 is supported in ball bearings 12 mounted on the tubular part 11.

The free end of the transmission shaft 6 projecting into the area radially inside the rotor 8 and the stator 9 is designed as a splined shaft 13. This splined shaft 13 carries the axially movable hub 15 of the clutch disk 14 of the second clutch 5. This clutch disk 14 carries organic clutch linings 16 on both axial sides of its radially outer circumferential area.

Between the hub 15 and the clutch linings 16, the clutch disk 14 has torsional vibration dampers 17, which damp vibrations in the radially circumferential direction.

In the area of the clutch linings 16, a ring-shaped flywheel 18 with a flywheel friction surface 19 and a support ring 20 of the rotor 8 project radially inward from the rotor 8. Spacer bolts 21, which project with play through appropriate openings in a ring-shaped diaphragm spring 22, are attached to the support ring 20. These bolts are uniformly distributed around a radially inner circumferential circle and project axially toward the clutch disk 14. The diaphragm spring 22 is supported axially by way of a tilt ring 23 on each side against the support ring 20 and the mushroom-shaped free end of the spacer bolts 21. Acting by way of an axial ball bearing 25, which surrounds the transmission shaft 6, a release device 24 can exert a force on the inner area of the diaphragm spring 22, radially inside the spacer bolts 21.

In FIG. 1, the axial ball bearing 25 can be actuated axially by a plunger 28, which acts by way of a release lever 27 and a release ring 26, which surrounds the transmission shaft 6.

Figure 2:
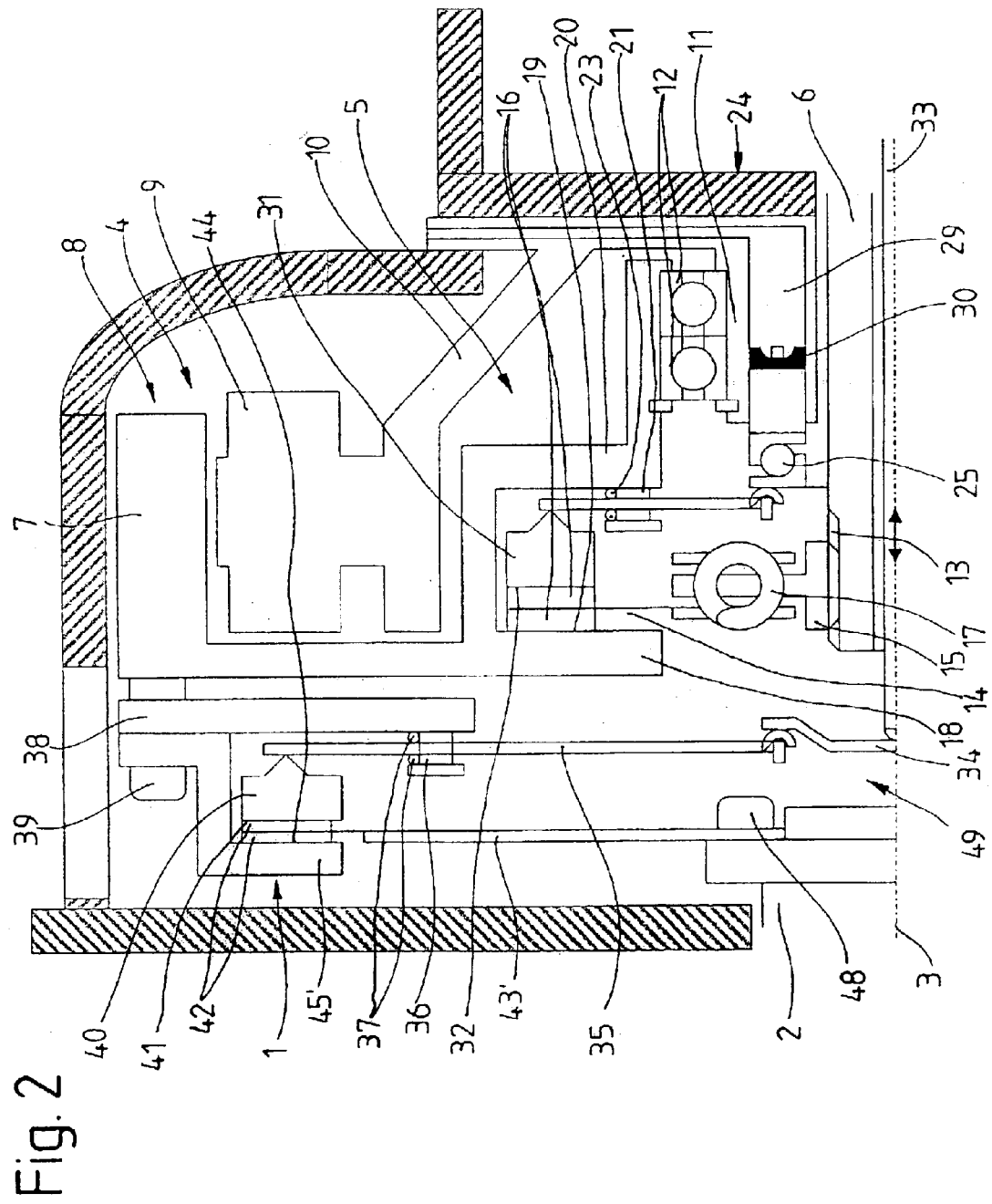
FIG. 2 shows a cross section through half of a second exemplary embodiment of a clutch unit.

In FIG. 2, a ring cylinder 29 is designed into the ring-shaped part 11; a ring-shaped piston 30 moves inside this cylinder. Hydraulic force acts on one side of the piston, with the result that the other side of the piston exerts force on the axial ball bearing 25.

The radially outer area of the diaphragm spring 22 rests axially against one side of a ring-shaped pressure plate 31, the other side of which has a pressure plate friction surface 32. When the release device 24 is not being actuated, the diaphragm spring 22 uses its preloaded elastic force to actuate the pressure plate 31, so that the clutch disk 14 is clamped by its clutch linings 16 between the flywheel friction surface 19 of the flywheel 18 and the pressure plate friction surface 32 of the pressure plate 31, with the result that the second clutch 5 becomes engaged. Upon actuation of the release device 24, the diaphragm spring 22 pivots out of its approximately radial orientation to such an extent that this clamping effect is released and the second clutch 5 is disengaged.

The transmission shaft 6 is designed as a hollow shaft, through which the actuating rod 33 of the release device 49 passes, this rod being free to slide in the axial direction. The center part of a release disk 34 can be actuated in the axial direction and thus moved in the release direction by the end surface of the actuating rod 33, which projects out from the transmission shaft 6. The radially outer circumferential area of the release disk 34 can exert force on the radially inner circumferential area of the diaphragm spring 35 of the first clutch 1. In the same way as the diaphragm spring 22, this diaphragm spring 35 is mounted pivotably by way of tilt rings 37 on spacer bolts 36, which are attached to a radially inward-pointing, ring-shaped part of the rotor 8. In FIG. 1, this ring-shaped component is the flywheel 18, and the spacer bolts 36 project out from the side of the flywheel which faces away from the flywheel friction surface 19. In FIG. 2, the ring-shaped component is a support ring 38, which is connected by connecting screws 39 to the ring-like part 7 of the rotor 8.

The radially outer circumferential area of the diaphragm spring 35 rests axially against one side of a ring-shaped pressure plate 40, the other side of which has a pressure plate friction surface 41, which the diaphragm spring 35 can push against the clutch linings 42 of sintered metal on one side of the clutch disk 43 or 43' of the first clutch 1.

The clutch linings 42 attached to the opposite side of the clutch disk 43 or 43' are pressed against a flywheel friction surface 44 of a radially inward-directed, ring-shaped flywheel part 45 or 45'. In FIG. 2, this flywheel part 45' is also connected by the connecting screws 39 to the ring-like part 7 of the rotor 8. In FIG. 1, the flywheel part 45 is designed as an integral part of the rotor 8. This design makes it possible for the clutch disk 43' of the first clutch 1 in FIG. 2 to have a much larger diameter that the clutch disk 43 of the second clutch 5. For this purpose, the first clutch 1 in FIG. 2 is mounted axially adjacent to the rotor 8 and the stator 9. In FIG. 1, the first clutch 1 is mounted radially inside the rotor 8 and the stator 9 just like the second clutch 5 in both FIGS. 1 and 2.

The radially inner part of the clutch disk 43 in FIG. 1 has a hub 46, which has radially inward-directed teeth, which allow it to be mounted with freedom to slide in the axial direction on a set of wedge-shaped teeth 47 on the radially circumferential lateral surface of a disk which is rigidly connected to the crankshaft 2. Screws 48 are used to attach the clutch disk 43' in FIG. 2 to the crankshaft 2 in a torsion-proof manner.

The radially outer area of the clutch disk 43' carrying the clutch linings 42 is preloaded at an angle to a radially oriented position, so that, when the first clutch 1 is disengaged, this area tilts out of the radially oriented position, which ensures the disengagement of the clutch linings 42 from the flywheel friction surface 44 and the pressure plate friction surface 41.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A clutch unit for a motor vehicle, said clutch unit composing:
   a crankshaft starter-generator comprising a stator having a stator coil mounted on a stationary component, and a flywheel which can rotate about an axis of rotation, said flywheel having at least one permanent magnet forming a rotor which can be moved past the stator coil, each said at least one permanent magnet having a pole field which is directed radially inward, said stator being surrounded radially by said rotor;
   a first clutch by which a crankshaft of an internal combustion engine can be connected to said flywheel;
   a second clutch by which a transmission shaft can be connected to said flywheel; and separately operated actuating means for actuating each of said first and second clutches, whereby said first and second clutches can be engaged either independently or in common.

2. A clutch unit as in claim 1 wherein at least one of said first and second clutches comprises a clutch disk which can rotate about said axis of rotation, said flywheel having a friction surface corresponding to each said clutch disk, said clutch unit further comprising a pressure plate for each said clutch disk, each said pressure plate having a friction surface which can exert an axial force against the respective clutch disk to press the disk against the respective friction surface of said flywheel.

3. A clutch unit as in claim 1 wherein at least one of said first and second clutches is located radially inside of said rotor and said stator.

4. A clutch unit as in claim 1 wherein said first clutch is located axially outside of said rotor and said stator.

5. A clutch unit as in claim 4 wherein each of said first and second clutches comprises a clutch disk having a diameter, said diameter of said clutch disk of said first clutch being larger than the diameter of said clutch disk of said second clutch.

6. A clutch unit as in claim 1 wherein said stationary component comprises a tubular part, said rotor being rotatably supported on said tubular part.

7. A clutch unit as in claim 1 wherein said rotor comprises a bearing located axially on a side of said first clutch facing said crankshaft.

8. A clutch unit as in claim 1 wherein said rotor comprises a bearing located axially on a side of said second clutch facing said transmission shaft.

9. A clutch unit as in claim 1 wherein said rotor comprises a bearing having a plurality of roller bearings.

10. A clutch unit as in claim 2 wherein at least one of said clutch disks comprises friction linings which act on friction surfaces of the flywheel and at least one of said pressure plates.

11. A clutch unit as in claim 10 wherein first clutch disk has sintered friction linings.

12. A clutch unit as in claim 10 wherein said second clutch disk has sprung organic clutch linings.

13. A clutch unit as in claim 2 wherein said clutch disk of said first clutch is connected to said crankshaft circumferentially in a friction-proof manner.

14. A clutch unit as in claim 2 wherein said clutch disk of said second clutch comprises torsional vibration dampers installed radially between said clutch linings and said transmission shaft.

15. A clutch unit as in claim 2 wherein at least one of said clutch disks is axially flexible.

16. A clutch unit as in claim 15 wherein at least one of said clutch disks is axially slideable on a respective at least one of said crankshaft and said transmission shaft.

17. A clutch unit as in claim 16 wherein said at least one of said crankshaft and said transmission shaft comprises a splined part on which said at least one of said clutch disks is axially moveable.

18. A clutch unit as in claim 15 wherein said at least one of said clutch disks comprises an area which pretensions the respective clutch lining into a position which is at an angle to a radially oriented position.

19. A clutch unit as in claim 2 wherein at least one of said actuating means comprises a release device which pivots an annular diaphragm spring to act on the respective pressure plate.

20. A clutch unit as in claim 19 wherein the release device of said first clutch comprises an actuating rod which passes slideably through the transmission shaft and can pivot said diaphragm spring.

21. A clutch unit as in claim 19 wherein the release device of the second clutch comprises an axial bearing which surrounds the transmission shaft with play and can pivot the diaphragm spring.

22. A clutch unit as in claim 21 further comprising one of a release lever and a pressure cylinder concentric to the axial bearing which can exert force on the axial bearing to slide the axial bearing in the axial direction.

23. A clutch unit for a motor vehicle, said clutch unit comprising:

a crankshaft starter-generator comprising a stator having a stator coil mounted on a stationary component, and a flywheel which can rotate about an axis of rotation, said flywheel having at least one permanent magnet with a pole field which can be moved past the stator coil, thereby forming a rotor;

a first clutch by which a crankshaft of an internal combustion engine can be connected to said flywheel;

a second clutch by which a transmission shaft can be connected to said flywheel, wherein at least one of said first and second clutches comprises a clutch disk which is axially flexible and can rotate about said axis of rotation, said clutch disk having a friction lining and an area which pretensions the friction lining into a position which is at an angle to a radially oriented position, said flywheel having a friction surface corresponding to each said clutch disk;

a pressure plate for each said clutch disk, each said pressure plate having a friction surface which can exert an axial force against the respective clutch disk to press the disk against the respective friction surface of said flywheel; and separately operated actuating means for actuating each of said first and second clutches, whereby said first and second clutches can be engaged either independently or in common.

24. A clutch unit as in claim 23 wherein at least one of said first and second clutches is located radially inside of said rotor and said stator.

25. A clutch unit as in claim 23 wherein said first clutch is located axially outside of said rotor and said stator.

26. A clutch unit as in claim 25 wherein each of said first and second clutches comprises a clutch disk having a diameter, said diameter of said clutch disk of said first clutch being larger than the diameter of said clutch disk of said second clutch.

27. A clutch unit as in claim 23 wherein said stationary component comprises a tubular part, said rotor being rotatably supported on said tubular part.

28. A clutch unit as in claim 23 wherein said rotor comprises a bearing located axially on a side of said first clutch facing said crankshaft.

29. A clutch unit as in claim 23 wherein said rotor comprises a bearing located axially on a side of said second clutch facing said transmission shaft.

30. A clutch unit as in claim 23 wherein said rotor comprises a bearing having a plurality of roller bearings.

31. A clutch unit as in claim 23 wherein at least one of said clutch disks comprises friction linings which act on friction surfaces of the flywheel and at least one of said pressure plates.

32. A clutch unit as in claim 31 wherein first clutch disk has sintered friction linings.

33. A clutch unit as in claim 31 said second clutch disk has sprung organic clutch linings.

34. A clutch unit as in claim 23 wherein said clutch disk of said first clutch is connected to said crankshaft circumferentially in a friction-proof manner.

35. A clutch unit as in claim 23 wherein said clutch disk of said second clutch comprises torsional vibration dampers installed radially between said clutch linings and said transmission shaft.

36. A clutch unit as in claim 23 wherein at least one of said clutch disks is axially slideable on a respective at least one of said crankshaft and said transmission shaft.

37. A clutch unit as in claim 36 wherein said at least one of said crankshaft and said transmission shaft comprises a splined part on which said at least one of said clutch disks is axially moveable.

38. A clutch unit as in claim 23 wherein at least one of said actuating means comprises a release device which pivots an annular diaphragm spring to act on the respective pressure plate.

39. A clutch unit as in claim 38 wherein the release device of said first clutch comprises an actuating rod which passes slideably through the transmission shaft and can pivot said diaphragm spring.

40. A clutch unit as in claim 38 wherein the release device of the second clutch comprises an axial bearing which surrounds the transmission shaft with play and can pivot the diaphragm spring.

41. A clutch unit as in claim 40 further comprising one of a release lever and a pressure cylinder concentric to the axial bearing which can exert force on the axial bearing to slide the axial bearing in the axial direction.

42. A clutch unit for a motor vehicle, said clutch unit comprising:

a crankshaft starter-generator comprising a stator having a stator coil mounted on a stationary component, and a flywheel which can rotate about an axis of rotation, said flywheel having at least one permanent magnet with a pole field which can be moved past the stator coil, thereby forming a rotor;

a first clutch by which a crankshaft of an internal combustion engine can be connected to said flywheel;

a second clutch by which a transmission shaft can be connected to said flywheel, wherein at least one of said first and second clutches comprises a clutch disk which can rotate about said axis of rotation, said flywheel having a friction surface corresponding to each said clutch disk;

a pressure plate for each said clutch disk, each said pressure plate having a friction surface which can exert an axial force against the respective clutch disk to press the disk against the respective friction surface of said flywheel; and separately operated actuating means for actuating each of said first and second clutches, at least one of said actuating means comprising a release device which pivots an annular diaphragm spring to act on the respective pressure plate, the release device of said first clutch comprising an actuating rod which passes slideably through the transmission shaft and can pivot said diaphragm spring, whereby said first and second clutches can be engaged either independently or in common.

43. A clutch unit as in claim 42 wherein at least one of said first and second clutches is located radially inside of said rotor and said stator.

44. A clutch unit as in claim 42 wherein said first clutch is located axially outside of said rotor and said stator.

45. A clutch unit as in claim 44 wherein each of said first and second clutches comprises a clutch disk having a diameter, said diameter of said clutch disk of said first clutch being larger than the diameter of said clutch disk of said second clutch.

46. A clutch unit as in claim 42 wherein said stationary component comprises a tubular part, said rotor being rotatably supported on said tubular part.

47. A clutch unit as in claim 42 wherein said rotor comprises a bearing located axially on a side of said first clutch facing said crankshaft.

48. A clutch unit as in claim 42 wherein said rotor comprises a bearing located axially on a side of said second clutch facing said transmission shaft.

49. A clutch unit as in claim 42 wherein said rotor comprises a bearing having a plurality of roller bearings.

50. A clutch unit as in claim 42 wherein at least one of said clutch disks comprises friction linings which act on friction surfaces of the flywheel and at least one of said pressure plates.

51. A clutch unit as in claim 50 wherein first clutch disk has sintered friction linings.

52. A clutch unit as in claim 50 said second clutch disk has sprung organic clutch linings.

53. A clutch unit as in claim 42 wherein said clutch disk of said first clutch is connected to said crankshaft circumferentially in a friction-proof manner.

54. A clutch unit as in claim 42 wherein said clutch disk of said second clutch comprises torsional vibration dampers installed radially between said clutch linings and said transmission shaft.

55. A clutch unit as in claim 42 wherein the release device of the second clutch comprises an axial bearing which surrounds the transmission shaft with play and can pivot the diaphragm spring.

56. A clutch unit as in claim 55 further comprising one of a release lever and a pressure cylinder concentric to the axial bearing which can exert force on the axial bearing to slide the axial bearing in the axial direction.

* * * * *